Patented June 15, 1937

2,084,027

UNITED STATES PATENT OFFICE 2,084,027

HYDROXY-CHLORODIPHENYL DERIVATIVES

Morton Harris, Anniston, Ala., assignor, by mesne assignments, to Monsanto Chemical Company, a corporation of Delaware No Drawing. Application March 21, 1935, Serial No. 12,252

10 Claims. (Cl. 260—154)

The present invention comprises derivatives of chlorodiphenyl, particularly those compounds in which the chlorine and hydroxy radicals are substituted in different rings of the hydrocarbon. The compounds embraced within my present invention are the 2-hydroxy-4'-chlorodiphenyl and derivatives thereof, and the 4-hydroxy-2'-chlorodiphenyl and derivatives thereof.

I have now found that the 2-amino-4'-chlorodiphenyl and the 4-amino-2'-chlorodiphenyl may be converted to the corresponding hydroxy derivatives by the following treatment:

Two hundred grams of 2-amino-4'-chlorodiphenyl are dissolved in a boiling solution of 300 c. c. of concentrated HCl in two liters of water. When completely dissolved, the solution is quickly cooled in a water bath and by the direct addition of ice, so as to obtain fine crystals of the amine hydrochloride. Further ice additions are made and, while maintaining a temperature of below 10° C. the hydrochloride is diazotized by slowly dropping in a 10% sodium nitrite solution. The end point of the reaction is taken when starch-iodide solution is darkened by a drop of the diazotized solution. Five minutes additional time is allowed after the last nitrite addition, and the diazonium salt solution is filtered to remove undiazotized amine hydrochloride. The filtered solution is then slowly added to ten liters of boiling water. The crude 2-hydroxy-4'-chlorodiphenyl settles to the bottom as an oil. The aqueous layer is decanted off and the 2-hydroxy-4'-chlorodiphenyl dissolved in 300 c. c. of 20% NaOH solution. This solution is then extracted with benzol to remove alkali insoluble matter. Upon acidifying the aqueous solution, the 2-hydroxy-4'-chlorodiphenyl separates as an oil which will usually crystallize upon standing.

Further purification of the product is carried out by fractional distillation under vacuum. It boils at 162° to 167° C. at 5–7 m. m., yielding a water-white product. Upon dissolving the distilled product in an equal volume of solvent "B" naphtha and allowing it to crystallize, needle crystals may be filtered off and vacuum dried. A yield of 107 grams of product melting at 51.5° to 52.5° C. is obtained from the above method.

The structural formula of the compound is believed to be:

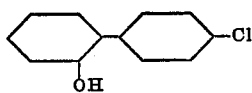

*Sodium salt of 2-hydroxy-4'-chlorodiphenyl*

Five grams of 2-hydroxy-4'-chlorodiphenyl are warmed with the theoretical amount of sodium hydroxide solution. The solution is evaporated to dryness under vacuum, leaving the sodium salt as a white crystalline residue. This product may also be prepared in flake form by cooling the saturated solution on a rotating drum in the usual manner.

The structural formula of this compound is believed to be:

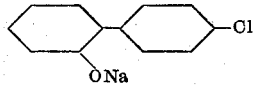

By a similar process the corresponding potassium salt can be prepared.

*4-hydroxy-2'-chlorodiphenyl*

One hundred grams of the 4-amino-2'-chlorodiphenyl are warmed with stirring with an excess of dilute hydrochloric acid. The insoluble hydrochloride is filtered off and sucked dry on a Buchner funnel. The amine hydrochloride is brought to a boil with one and one-half liters of 95% alcohol and then quickly cooled in an ice bath in order to obtain finely divided crystals. Forty-two and one-half cubic centimeters of concentrated HCl are added and, while maintaining a temperature below 10° C., a saturated solution of sodium nitrite is slowly dropped in. After reaching the end point, as indicated with starch-iodide solution, the reaction mixture is allowed to stand for an additional five minutes after the last nitrite addition. Any undiazotized amine hydrochloride present may be filtered from the solution and again diazotized.

The clear diazonium salt solution is then poured slowly into ten liters of boiling water and boiled for thirty minutes. Some hydroxy chlorodiphenyl will separate from solution as an oil; however, a considerable amount is soluble in the hydrolysis solution, and is extracted therefrom by shaking the cold solution with 500 c. c. of benzol.

The benzol solution thus obtained is now extracted with 500 c. c. of 10% sodium hydroxide solution. In this manner I separate the alkali soluble hydroxy-chlor from the non-hydroxy compounds which remain in solution of the benzol. The alkaline aqueous extract is now acidified and the 4-hydroxy-2'-chlorodiphenyl separates out as an oil which crystallizes upon standing.

The crystals thus obtained are filtered off, washed with water, again recrystallized from solvent "B" naphtha and recovered in the form of needles. The air dried crystals thus formed are dark colored. A white product is obtained by distilling the material from one flask to another under a vacuum of 3–4 m. m. The boiling point at this pressure lies between 183° and 185° C. Yield is 75 grams of crystalline material melting at 90.5° to 91° C.

The structural formula of this compound is believed to be:

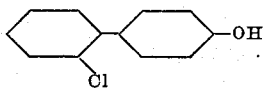

*Sodium salt of 4-hydroxy-2'chlorodiphenyl*

Five grams of 4-hydroxy-2'-chlorodiphenyl are neutralized with the exact equivalent of sodium hydroxide solution. The solution is evaporated under vacuum and the product obtained as white crystals. If desired, the evaporation and drying may be carried out on a flaker and the product obtained as thin white uniform flakes.

The structural formula of the product is believed to be:

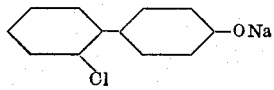

The hydroxy chlorodiphenyls and derivatives herein described and others made therefrom may be employed for a variety of purposes, such as in rubber chemicals, dyes, pharmaceuticals, insecticides, fungicides, disinfectants and resins.

Having now particularly described my invention and how the same may be made and used, I am desirous that it be not limited except as indicated by the prior art or as particularly pointed out in the claims.

What I claim is:

1. A compound of diphenyl having the general formula:

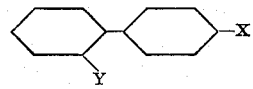

where one of the members X and Y is a chlorine atom, while the other member is a hydroxy radical.

2. A compound of diphenyl having the general formula:

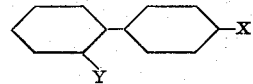

where one of the members X and Y is a chlorine atom, while the other members is an —ONa radical.

3. The compound 2 - hydroxy - 4' - chlorodiphenyl.
4. The compound 4 - hydroxy - 2' - chlorodiphenyl.
5. The crystalline compound, 2-hydroxy-4'-chlorodiphenyl, said compound having a melting point of approximately 51.5° to 52.5° C.
6. The crystalline compound, 4-hydroxy-2'-chlorodiphenyl, said compound having a melting point of approximately 90.5° to 91° C.
7. As a new compound, the sodium salt of 2-hydroxy-4'-chlorodiphenyl in flake form.
8. As a new compound, the 2-hydroxy-4'-chlorodiphenyl in flake form.
9. As a new compound, the 4-hydroxy-2'-chlorodiphenyl in flake form.
10. A new chemical compound having the formula—

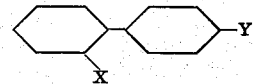

where one of the groups X and Y is selected from the class consisting of, OH and ONa, while the other group is a chlorine atom.

MORTON HARRIS.